United States Patent [19]

Plunkett, Sr.

[11] 4,142,565

[45] Mar. 6, 1979

[54] INSULATING DEVICE FOR FLUID CONDUIT

[76] Inventor: Hermon L. Plunkett, Sr., P.O. Box 79, Maxville, Fla. 32265

[21] Appl. No.: 807,981

[22] Filed: Jun. 20, 1977

[51] Int. Cl.$^2$ .................... B32B 7/08; B65D 65/08
[52] U.S. Cl. .................... 150/52 R; 24/204; 137/375; 138/32; 138/149; 428/100
[58] Field of Search .................... 24/204; 428/40, 100; 138/32, 99, 149; 150/52 R; 220/469, 85 P; 137/375

[56] References Cited

U.S. PATENT DOCUMENTS

| 2,985,552 | 5/1961 | Watanabe | 156/293 X |
|---|---|---|---|
| 3,147,528 | 9/1964 | Erb | 24/204 |
| 3,160,549 | 12/1964 | Caldwell et al. | 428/40 X |
| 3,185,197 | 5/1965 | Spiro et al. | 150/52 R |
| 3,316,669 | 5/1967 | Nachbar | 428/100 X |
| 3,408,705 | 11/1968 | Kayser et al. | 24/204 |
| 3,577,607 | 5/1971 | Ikoma | 24/204 |
| 3,660,849 | 5/1972 | Jonnes et al. | 428/423 X |
| 3,817,015 | 6/1974 | Frangos | 428/95 X |
| 3,906,129 | 9/1975 | Damois | 428/99 |
| 3,941,159 | 3/1976 | Toll | 428/100 X |

*Primary Examiner*—Henry F. Epstein
*Attorney, Agent, or Firm*—George H. Baldwin; Arthur G. Yeager

[57] ABSTRACT

A conduit for the transport of fluid at a temperature different from the temperature of the immediately surrounding ambient atmosphere may be quickly and efficiently protected against thermal transport by an insulating device comprising an elongating sheet of flexible heat insulating material having a length terminated by a top edge and a bottom edge, having a width slightly greater than the equitorial dimension of the fluid conduit and terminated by a first side edge and a second side edge and having an interior conduit-facing side and an exterior side, and means for releasably securing the elongated sheet about the fluid conduit.

5 Claims, 7 Drawing Figures

INSULATING DEVICE FOR FLUID CONDUIT

BACKGROUND OF THE INVENTION

The present invention relates to insulating devices and specifically to thermal insulating devices for use in conjunction with fluid conduits.

As is well known to those skilled in the art, the transporation of fluids through fluid-conducting conduits poses significant difficulties when the temperature of the immediately surrounding atmosphere is substantially different from that of the fluid itself. Such problems may arise under a multiplicity of differing conditions. For example, water pipes exposed to sub-freezing temperatures are particularly vulnerable to bursting when the water therein is allowed to freeze. In addition, the conduits used for the transportation of fluids whose temperature differs from that of the surrounding atmosphere, such as hot water pipes and air conditioning ducts are extremely vulnerable to transfers of large amounts of heat through the poorly insulating conduit materials. The prevention of such thermal transport losses has become one of ever-increasing importance in light of the necessity for fuel conservation.

Various devices such as those shown in U.S. Pat. Nos. 1,903,106 to Gillies; 2,099,669 to Bangs et al.; 2,650,180 to Walker; 2,985,552 to Watanable; 3,650,299 to Seiler et al.; and 3,906,129 to Damois have been utilized to prevent or minimize such thermal transport. Each of the aforementioned patents attempts to minimize thermal transport by surrounding the object for which insulation is desired by a layer containing thermally insulating materials. The surrounding of articles, in and of itself, is a well known method of operation as is indicated by U.S. Pat. Nos. 326,012 to Brooks; 2,124,259 to Murch; 2,344,369 to Salfisberg; 2,928,411 to Johnson; 2,966,226 to Kalis; and 3,519,023 to Burnes Sr. et al.; 3,143,154 to Best; and 3,185,197 to Spiro et al.

Despite the constant and increasing need for an efficient and effective thermal insulator for fluid conduits, each of the presently existing devices adapted for such use appears to be unwieldly, difficult to install and difficult to remove quickly and efficiently.

It is therefore an object of this invention to provide an insulating device for use with fluid conduits which will efficiently and effectively insulate such conduits against thermal transfer.

It is a further object of this invention to provide a thermal insulator which will continuously perform its function despite wide variations in the temperature of both the fluid conduit and the surrounding atmosphere.

It is a still further object of this invention to provide a wide-range thermal insulator which may be simply and easily installed about the fluid conduit.

It is a still further object of this invention to provide an easily installed wide temperature range thermal insulator which may be readily removed.

It is finally an object of the present invention to provide a device of the character described which is simple in construction, inexpensive, sturdy and resistant to the surrounding environmental conditions.

SUMMARY

It has now been discovered that a thermal insulating device for a fluid conduit which meets each of the objects hereinbefore mentioned may be constructed from an elongated sheet of flexible heat-insulating material having a length terminated by a top edge and a bottom edge, having a width of slightly greater than the equitorial dimension of said conduit and terminated by a first side edge and second side edge, and having an interior, conduit-facing side and an exterior side, a first elongated releasable adherent strip securingly engaged to said interior, conduit-facing side of said sheet adjacent said first side edge and extending therealong substantially the length of said first side edge, and a second releasable adherent strip securingly engaged to said exterior side of said sheet adjacent said second side edge, and extending therealong substantially the length of said second side edge.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing(s) in which:

DESCRIPTION OF THE PREFERRED EMBODIMENT

Figure 1:
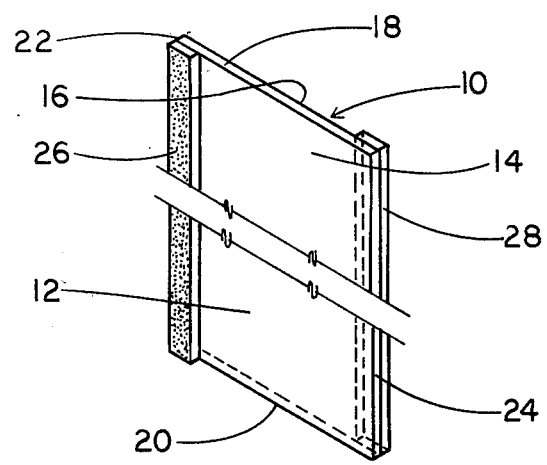
FIG. 1 is a perspective view of a thermal insulating device constructed in accordance with one embodiment of the invention.
Figure 2:
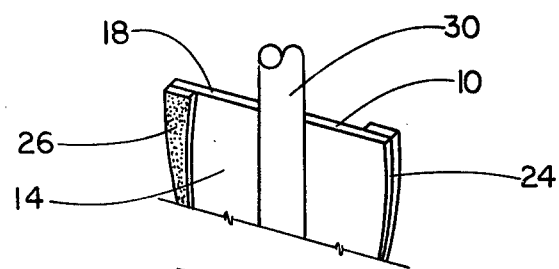
FIG. 2 is a perspective view of the thermal insulating device shown in FIG. 1 partially enclosing a fluid conduit.

Referring to FIGS. 1 and 2 there is seen an insulating device constructed in accordance with the invention indicated generally at 10. Insulating device 10 is constructed from a sheet of insulating material 12, having an interior, conduit-facing, side 14 and an exterior side 16. Sheet 12 may be of any desired length, and is terminated by a top edge 18 and a bottom edge 20. In addition, sheet 12 is constructed of any suitable width such that the sheet may be wrapped about a fluid conduit having an external equitorial dimension, i.e. an outside circumference for a cylindrical pipe, with a slight degree of overlap of first side edge 22 over second side edge 24 as described further below.

Sheet 12 may be fabricated from any suitable insulating material which has sufficient flexibility to be tightly wrapped about the fluid conduit. In its preferred form, sheet 12 is fabricated from a flexible, polymeric synthetic rubber such as polychloroprene foam, commonly known as neoprene. For purposes of optimizing the thermal insulating qualities of sheet 12, it has been found that a synthetic, closed cell neoprene sponge rubber, such as that marketed by and commercially available from Herco, performs to optimum standards of thermal insulating efficiency over a broad temperature range of from about +100° F. to about −100° F. Under climatic conditions of from −100° F. to about −450° F., the optimum material from which to fabricate sheet 12 is a silicone sponge rubber such as those commercially available from Herco.

A first releasable adherent strip 26 is securingly engaged to the interior conduit-facing side 14 of sheet 12 immediately adjacent first side edge 22 along substantially the entire length thereof. Second releasable adherent strip 28 is securingly engaged to the exterior side 16 of sheet 12 immediately adjacent the second side edge 24 along substantially the entire length thereof.

First and second releasable adherent strips 26 and 28 respectively may be made of any suitable materials which are releasably bondable to each other, and which bond to each other and release from each other under the climatic conditions referred to above.

Figure 3:
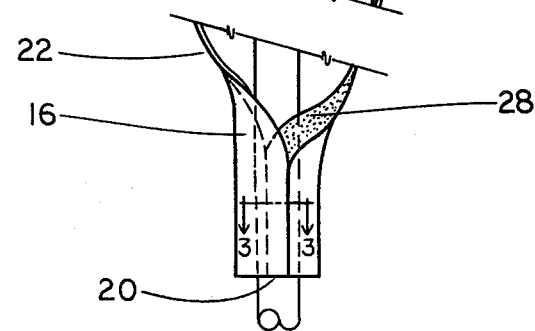
FIG. 3 is a partial sectional view of the device taken along line 3—3 of FIG. 2 on an enlarged scale.
Figure 3:
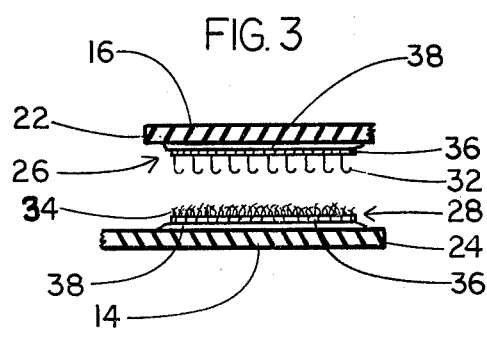
Figure 4:
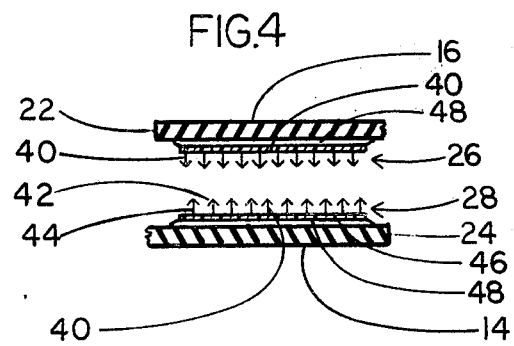
FIG. 4 is a sectional view of an alternative embodiment of the device also on an enlarged scale.

Referring to FIGS. 3 and 4 there are seen two alternative examples of releasable adherent strip materials suitable for use in the invention. FIG. 3 shows first and second adherent strips 26 and 28 respectively as being fabricated from flexible hooks 32 and exposed loop pile 34, the same as, or similar to, materials commonly marketed under the tradename "Velcro". Both the hooks 32 and the pile material 34 are bonded to a suitable base material 36 which may include any material which functions under the temperature ranges hereinabove specified. This base material is, in turn, securingly bonded to sheet 12 along edges 22 and 24 respectively by any commercially available adhesive 38, which is compatible both with the base material and with the insulating material. The preferred adhesive for use when closed cell neoprene rubber is used as sheet material 12 is that commercially available under the brand name Herco Sponge Rubber Adhesive.

Referring to FIG. 4, there is seen an alternative embodiment of the releasable adherent strips indicated at 26 and 28 respectively. In the alternative embodiment, strips 26 and 28 are identically fabricated from small "mushroom-shaped" extensions 40, each having perpendicular stems 44 and outwardly extending convex caps, such as that commercially available from the 3M Company. Mushroom shaped extensions 40 are arranged in parallel rows having spacings therebetween such that the intrusion of an oppositely disposed extension will deform the facing extensions by inserting the mushroom "caps" 42 between stems 44 of the oppositely facing extensions. By so doing the "caps" 42 of extensions 40 interlock, thereby securing strips together. Since each extension is made of a resilient material, the interlocking bond may be broken with relative ease by applying a separating pressure of sufficient force. Once again the extensions 40 are bonded to a suitable base material 46 and secured to sheet 12 adjacent edges 22 and 24 respectively by any suitable adhesive 48. As with the embodiment disclosed in FIG. 3 suitability for base material and adhesive is determined on the basis of their performance characteristics under the temperature ranges recited hereinabove.

Referring to FIG. 2, there can be seen the operation of this invention. Fluid conduit 30 is encased in insulating sheet 12 by wrapping sheet 12 thereabout. The width of sheet 12 is predetermined such that sheet 12 may be wrapped about the fluid conduit 30 with a slight overlap sufficient to allow releasable adherent strips 26 and 28 to be superimposed and forced into an interlocking relationship.

Figure 5:
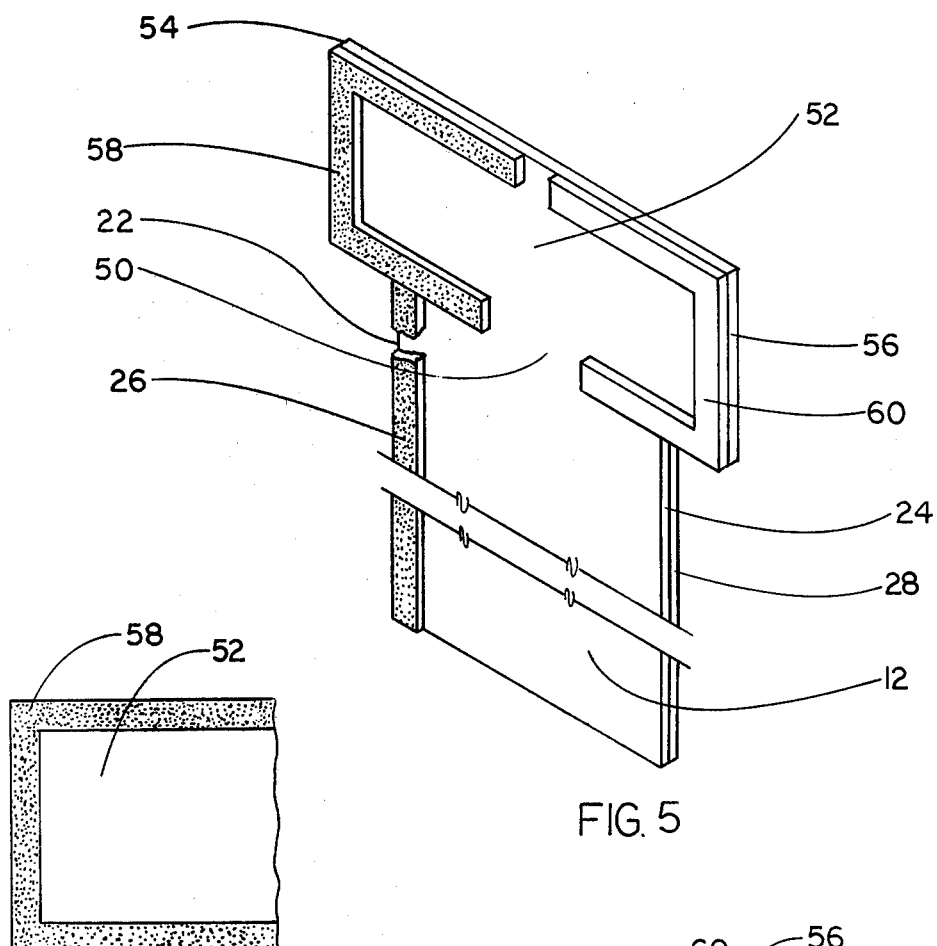
FIG. 5 is a perspective view of an alternative embodiment of a thermal insulating device constructed in accordance with the invention.
Figure 7:
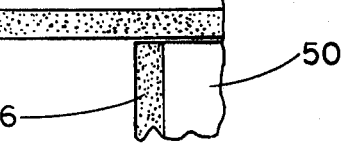
FIG. 7 is an enlarged elevational view of a portion of the device shown in FIG. 5.
Figure 6:
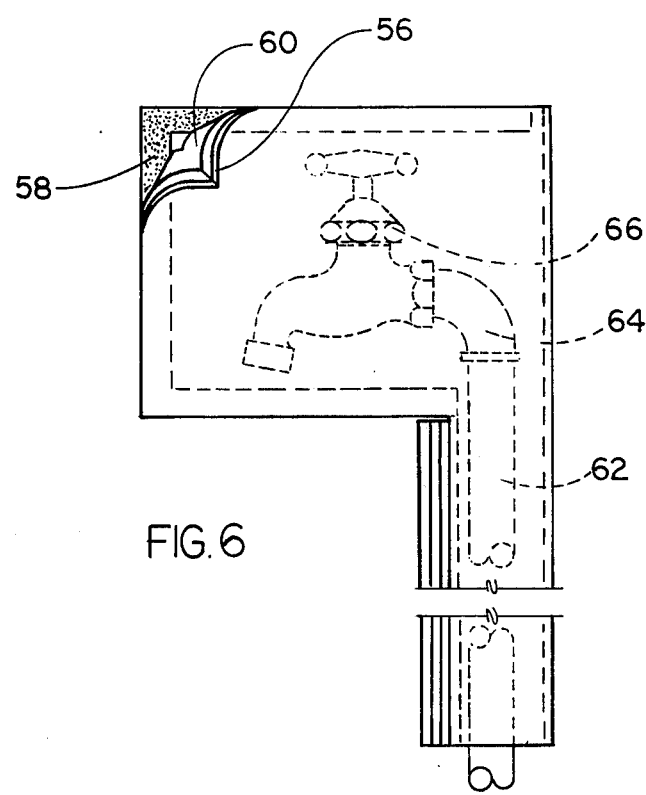
FIG. 6 is an elevational view of the device shown in FIG. 5 enclosing a fluid conduit.

FIGS. 5, 6 and 7 disclose an alternative embodiment of the invention for use in conjunction with a fluid conduit terminating in a flow-interrupting valve, such as an exposed water pipe having a faucet. As with the embodiment previously shown in FIGS. 1 and 2, the alternative embodiment of the invention comprises flexible insulating sheet 12 having releasable adherent strips 26 and 28 applied to opposite sides 14 and 16 respectively of sheet 12 at opposite edges 22 and 24 respectively. In the alternative embodiment, however, sheet 12 extends upwardly through a central neck 50 in the top edge thereof connecting sheet 12 with second sheet 52. Sheet 52, as seen in FIG. 5, has a width extending to a first lateral extension 54 and second lateral extension 56, each of which has an outer edge, an interior conduit-facing side and an exterior side. Third releasable adherent strip 58 is securingly bonded to the interior conduit-facing side of first end 54 immediately adjacent the outer edge thereof. In like fashion, releasable adherent strip 60 is bonded to the interior conduit-facing side of second end 56 immediately adjacent to the outer edge thereof. As is set forth hereinabove, releasable adherent strips 58 and 60 may consist of a mutually compatable arrangement of Velcro-type hook-and-pile fastener material, or, alternatively, may each be fabricated utilizing identical "mushroom shaped" extensions.

Referring to FIG. 6, there is seen the alternative embodiment of the invention is fully closed orientation enveloping a water pipe 62 connected to a faucet 66 by connector 64. As is shown in FIG. 6 sheet 12 is wrapped securely about the water pipe 62 by overlapping the first and second side edges 22 and 24 such that releasable adherent strips 26 and 28 are superimposed on each other thereby forming a releasable interlocking relationship. Insulating neck 50 is wrapped about connector 64, and first end 54 and second end 56 of second sheet 52 are superimposed upon each other forming a releasable bond between adherent materials 58 and 60. In such fashion, water pipe 62 and connector 64 are insulated against the ambient atmosphere independently of valve or faucet 66. As will be readily understood by those skilled in the art, one wishing to operate faucet 66 may merely separate first and second ends 54 and 56 respectively without disturbing sheet 12 about water pipe 62.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the invention.

What is claimed as new and what it is desired to secure by Letters Patent of the United States is:

1. An insulating device for encasing an elongated fluid conduit, having an external equatorial dimension, said device comprising
 a. a first elongated sheet of flexible heat-insulating material having a length terminated by a top edge and a bottom edge, having a width slightly greater than the external equitorial dimension of said conduit and terminated by a first side edge and a second side edge, and having an interior conduit-facing side and an exterior side;
 b. a first elongated releasable adherent strip securingly engaged to said interior conduit-facing side of said sheet adjacent said first side edge and extending therealong substantially the length of said first side edge;
 c. a second releasable adherent strip securingly engaged to said exterior side of said sheet adjacent said second side edge, and extending therealong substantially the length of said second side edge;

d. a neck of said first sheet extending centrally from said top edge; and e. a second sheet of flexible heat-insulating material connected by said neck to said first sheet, said second sheet having an interior conduit-facing side and an exterior side and a first lateral extension and a second opposed lateral extension, each said lateral extension terminating in an outer edge, a third releasable adherent strip securingly engaged to said interior conduit-facing side of said first lateral extension immediately adjacent said outer edge thereof, and a fourth releasable adherent strip securingly engaged to said interior conduit-facing side of said second lateral extension immediately adjacent said outer edge thereof said third and fourth strips when attached providing an encasing space between said first and second extensions for a valve connected to said fluid conduit.

2. The insulating device as set forth in claim 1 wherein said first elongated releasable adherent strip comprises a first elongated base strip and a plurality of deformable hooks bonded to, randomly distributed over the length of, and extending outwardly from, said first elongated base strip and wherein said second elongated releasable adherent strip comprises a second elongated base strip and a resilient pile of looped filaments. bonded to said second elongated base strip and extending outwardly therefrom over substantially the entire length thereof, said hooks adapted to releasably engage said pipe of looped filaments.

3. The insulating device as set forth in claim 1 wherein said first and said second elongated releasable adherent strips each individually comprise an elongated base strip and a plurality of close-packed mushroom-shaped extensions, each said extension having an elongated stem bound at one end thereof substantially perpendicularly to said base strip and a generally hemi-spherical cap bonded at a central point thereof to the other end of said stem such that the convex side of said hemi-spherical cap extends outwardly from said base strip.

4. The insulating device as set forth in claim 1 wherein said first and said third releasable adherent strips each comprise a first base strip and a plurality of deformable hooks bonded to, randomly distributed over the length of, and extending outwardly from, said first base strip and wherein said second and said fourth releasable adherent strip each comprise a second base strip and a resilient pile of looped filaments bonded to said second base strip and extending therefrom.

5. The insulating device as set forth in claim 1 wherein said first, said second, said third and said fourth releasable adherent strips each comprise a elongated base strip and a plurality of close-packed mushroom-shaped extensions, each said extension having an elongated stem bound at one end substantially perpendicularly to said base strip and a generally hemi-spherical cap bonded at a central point thereof to the other end of said stem such that the convex side of said hemi-spherical cap extends outwardly from said base strip.

* * * * *